Jan. 9, 1968  W. KIRCHNER ET AL  3,362,112
PRECISION MACHINE TOOL
Filed April 5, 1965  2 Sheets-Sheet 1

Inventors
Willi Kirchner
Gerhard Braune
By Stevens, Davis, Miller & Mosher, Attorneys Jan. 9, 1968   W. KIRCHNER ETAL   3,362,112
PRECISION MACHINE TOOL Filed April 5, 1965   2 Sheets-Sheet 2

Inventors
Willi Kirchner
Gerhard Braune
By Stevens, Davis, Miller & Mosher, Attorneys ed States Patent Office 3,362,112
Patented Jan. 9, 1968

3,362,112
PRECISION MACHINE TOOL
Willi Kirchner, Schwebheim, and Gerhard Braune, Schweinfurt, Germany, assignors to Kugelfischer Georg Schafer and Company, Schweinfurt, Germany
Filed Apr. 5, 1965, Ser. No. 445,450
Claims priority, application Germany, Apr. 9, 1964, K 52,630
20 Claims. (Cl. 51—332)

ABSTRACT OF THE DISCLOSURE

A rotating grinding tool for machine surfaces having a pair of machining elements for accomplishing successive stages of grinding and having their advancement independently adjusted. Means are provided to permit substantially frictionless movement of each element against the surface to be machined under the influence of centrifugal force when the tool is rotated.

This invention relates to tools for the precision machining of axially symmetric inner and outer surfaces and of faces.

Common machining tools, called hones for honing or lapping, essentially comprise an outer housing in which the abrasive is radially movable. The movement of the abrasive is caused mechanically or hydraulically, whereby the abrasive is moved outwardly or inwardly, in sliding guides, against the work piece.

All known tools of this kind have either coarse stones, which cause a very quick removal of the material during the rough grinding, or fine stones, which produce a surface of good quality during the finishing operation. Thus, for the production of each surface at least two stages of operation and at least two machining tools are necessary, which are alternately used.

This alternation of tools to machine the surface of each work piece requires longer setting up periods, than would be the case were a single machining tool to operate continuously during the entire operation. For example, in the manufacture of ball bearings rings, which are produced in very large quantities, this is most advantageous, since all surfaces of each ring must be machined.

An object of the invention is a machine tool that operates continuously during the entire machining operation.

Another object of the invention is a machine that accomplishes the grinding of two successive stages of the machining as a single operation, with continuous operation of the tool.

A further object of the invention is a machine tool that operates continuously during the rough and final grinding of a work piece.

A still further object of the invention is a machine tool the machining elements of which move friction-free or substantially friction-free and which embraces any of the above objects of the invention.

These and further objects of the invention will be apparent from the following detailed description and from the drawings, wherein.

Figure 1:
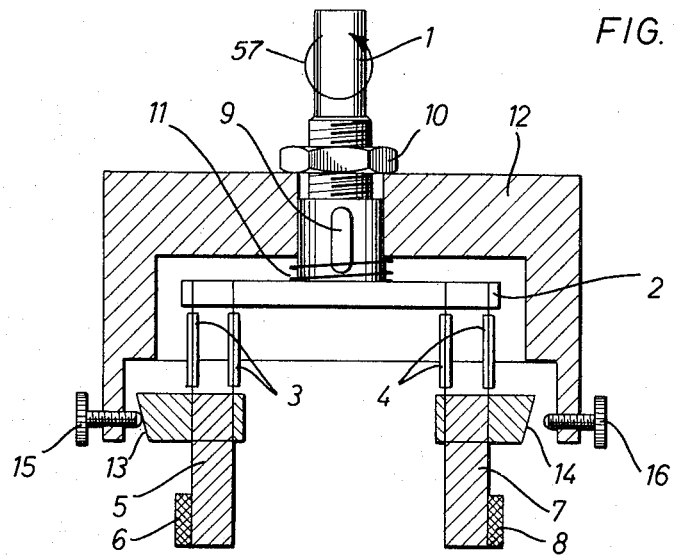
FIGURES 1 and 2 are cross sectional views of two embodiments for machining the surfaces of bores.

Referring to FIGURE 1, a tang 1 is provided with a flange 2 at its lower end. The flange has two flat spring link quardrangles 3 and 4, one of which carries a holder 5 for a machining element 6 that rough grinds and the other of which carries a holder 7 for a machining element 8 that does the final machining. A cover or skirt 12 is secured to the tang 1 by means of a spring and groove assembly 9 that prevents rotation of the cover. A nut 10 cooperates with a compression spring 11 permitting axial movement of the cover, which is provided with set screws 15 and 16 located opposite the tapered stops 13 and 14. The set screws, in cooperation with jigs or gauges (not shown) adjust the advance of the elements 6 and 8, which are moved outwardly by centrifugal force, when the machine tool rotates, (as shown by the curved arrow 57) against the surface of the bore. During the first stage of the machining both tool elements 6 and 8 are employed until a stipulated definite diameter of the work piece is achieved; afterwards, only the element 8 is used until the desired diameter is obtained in the last stage of the operation. In order to permit adjustment of the machine tool when the elements 6 and 8 wear away, the flange 2, and thus also the tapered stops 13 and 14, opposite the set screws 15 and 16 on cover 12, can be moved against the force of spring 11 by means of the nut 10.

Figure 2:
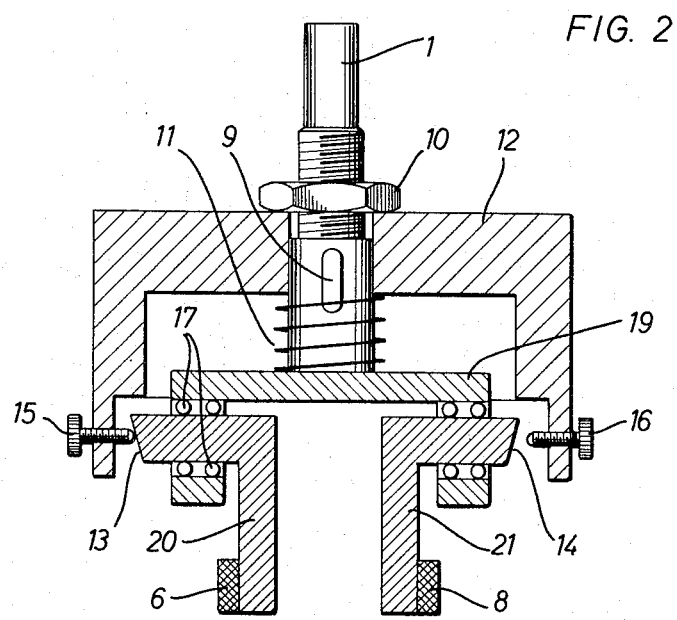

The embodiment of FIGURE 2, which operates in the same way as that of FIGURE 1, substitutes roller bearings 17 and 18 for the leaf spring quadrangles 3 and 4, the flange 19 and holders 20 and 21 being suitably modified with respect to the corresponding parts of FIGURE 1.

Figure 3:
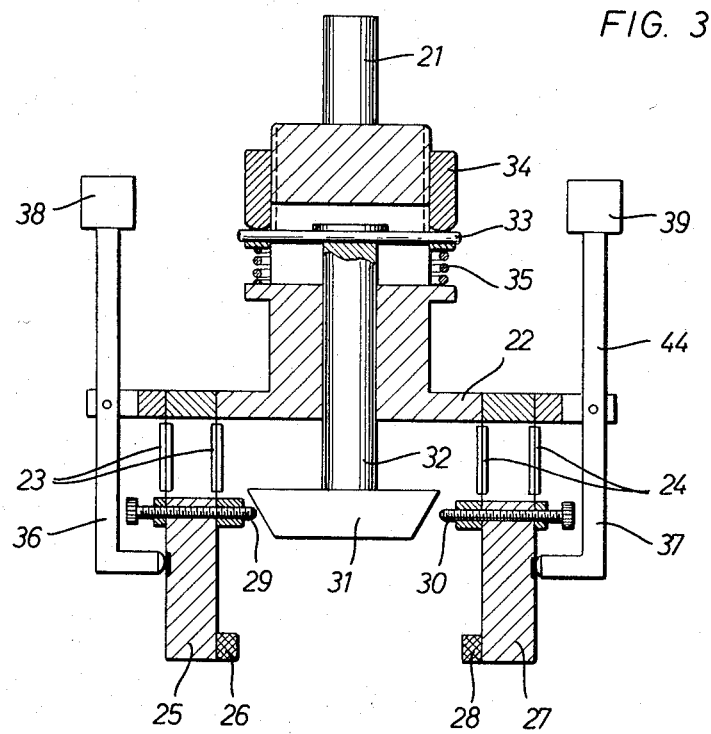
FIGURE 3 is a view in cross section of an embodiment for machining the outer surface of a cylinder.

The tool of FIGURE 3, for machining convex surfaces, has a tang 21 rigid with a flange 22, provided with leaf spring link quadrangles 23 and 24, respectively carrying a holder 25 for a rough-machining element 26 and a holder 27 supplied with a final-grinding element 28. The holders 25 and 27 are provided with set screws 29 and 30, which, suitably adjusted, determine, in cooperation with the tapered stop 31, the rough and final grinding diameters of the surface to be machined. The stop 31 is connected to a rod 32 that passes through the flange 22. The upper end of the rod has a transverse pin 33, which is secured in the slot of the flange 22 against rotation but left free to move axially. By means of a nut 34, the stop 31 can be adjusted vertically against the force of a spring 35, in order to compensate for the wearing away of the elements 26 and 28, without, however, having to change the settings of set screws 29 and 30. The flange 22 is also provided with two double levers 36 and 37, rotatably mounted, having fly weights 38 and 39. When the machine tool is rotated, the levers are rotated, as a consequence of the centrifugal forces occasioned by the fly weights 38 and 39, and their lower ends caused to press upon the holders 25 and 26, thereby moving the elements 26 and 28 against the work piece until the set screws 29 and 30 engage the stop 31 and the operation is finished.

In FIGURE 3 the rough grinding is already finished, since the set screw 29 engages the stop 31, while the machine element 28 continues to grind, until the final grinding is also completed, and the set screw 30 touches the stop 31.

Figure 4:
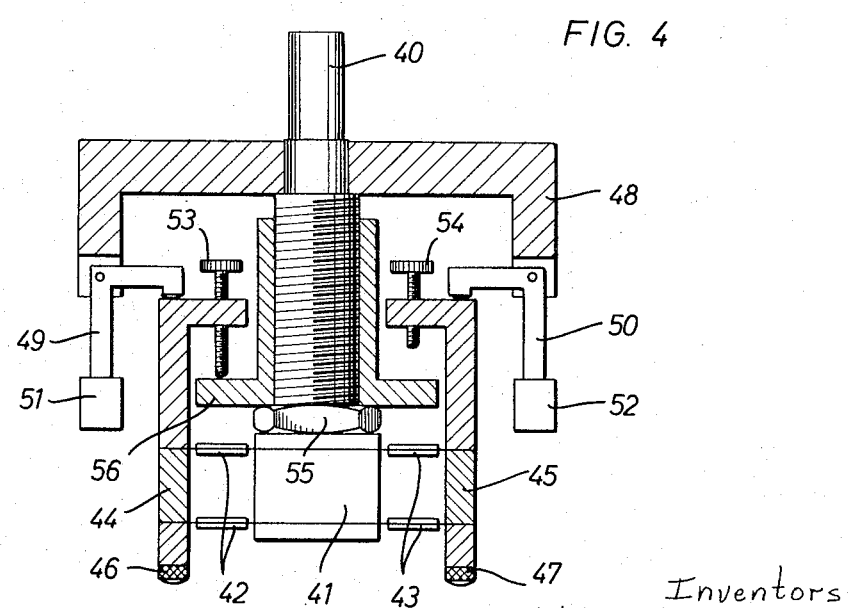
FIGURE 4 shows a tool of the invention for machining the torus shaped raceway of rings for axial bearings.

The tool of FIGURE 4, which, in its construction, embodies the forms of FIGURES 1, 2 and 3, has a tang 40 of which the head 41 is provided with leaf spring link quadrangles 42 and 43 respectively carrying the holders 44 and 45 for the machining elements 46 and 47 respectively. A cover 48 is rigid with the tang 40 and has two rotatably mounted angle levers 49 and 50, each provided with a fly weight 51 and 52, respectively. When the tool is rotated, the levers 49 and 50 are forced, by the centrifugal force of their fly weights, against the holders 44 and 45, respectively, in turn causing the machining elements 46 and 47 to move vertically downward against the work piece. By means of setting screws 53, 54 associated with the holding means 44, 45, which cooperate with a flange 56 that is fastened by a pin 40 which is adjustable with the aid of a screw thread, and secured by a counter-nut 55, it is possible to limit the downward path of the holding means 44, 45 with respect to the work piece.

In FIGURE 4, the set screw 53 for machining element 46, which acts to quickly remove material, already contacts the flange 56. The first stage of the operation thus is over. The element 47 continues the precision grinding until the set screw 54 contacts the flange 56 and the operation is finished.

The machining elements can be used alone or together with a soaked abrasive, but embedded with diamonds. Even the customary abrasives can serve as machining elements.

Employment, in accordance with the invention, of leaf spring link quadrangles, which permit friction free movement of the machining elements, or of ball bearings, which permit nearly friction free movement of the machining elements, result in the complete elimination, in the first instance, or nearly complete elimination, in the second instance, of machining errors arising from the play existing in known sliding guides.

What is claimed is:

1. Rotating grinding tool for machining surfaces, said tool rotating about an axis, including: a first machining element for accomplishing one stage of grinding; a second machining element for accomplishing the next succeeding stage of grinding; first means for permitting independent adjustment of the advance of said first and second elements, whereby said elements can operate simultaneously on the same surface and one of said two elements can continue to operate after the other has been stopped from further advance; independent third means for each element, for permitting at least substantially frictionless movement thereof, against the surface machined, under the influence of centrifugal force when the tool is rotated; whereby two successive stages of the grinding of a surface are performed by a single tool operating continuously.

2. The tool of claim 1, including fourth means, for adjusting simultaneously the position of said first and second elements, to compensate for wear thereof.

3. The tool of claim 2, wherein said third means are each a non-friction linkage arrangement; and including individual holders for said first and second elements.

4. The tool of claim 3, including a tang; a flange at one end of said tang for carrying said linkages.

5. The tool of claim 4, including a dependent skirt supported by said tang and adjustably movable axially thereof, the bottom of said skirt lying opposite a part of said holders; first and second tapered stops located on respective ones of said holders and opposite said bottom of the skirt; and adjustable means, comprising said first means, associated with said skirt and cooperating with respective ones of said stop means.

6. The tool of claim 1, wherein the centrifugal force causes said first and second elements to move substantially radially outwardly with respect to said axis.

7. The tool of claim 2, including individual holders for said first and second elements.

8. The tool of claim 7, including a tang; a flange at one end of said tang for supporting said third means.

9. The tool of claim 8, including a dependent skirt supported by said tang and adjustably movable axially thereof, the bottom of said skirt lying opposite a part of said holders; first and second tapered stops located on respective ones of said holders and opposite said bottom of the skirt; and adjustable means, comprising said first means, associated with said skirt and cooperating with respective ones of said stop means.

10. The tool of claim 2, wherein said third means are each bearing means; and including individual holders for each of said first and second elements.

11. The tool of claim 10, including a tang; a flange at one end of said tang for carrying said linkages.

12. The tool of claim 11, including a dependent skirt supported by said tang and adjustably movable axially thereof, the bottom of said skirt lying opposite a part of said holders; first and second tapered stops located on respective ones of said holders and opposite said bottom of the skirt; and adjustable means, comprising said first means, associated with said skirt and cooperating with respective ones of said stop means.

13. The tool of claim 1, including a tang; centrifugal means pivotally mounted on said tool for causing said first and second elements to tend to move against the surface being machined during rotation of the tool; and wherein said third means are each a non-friction linkage arrangement; and including individual holders for said first and second elements.

14. The tool of claim 13, wherein said centrifugal means urges said first and second elements inwardly, for the machining of convex surfaces.

15. The tool of claim 14, including a flange, rigid with said tang, for carrying said linkages; a tapered stop depending from said flange; adjustable means, comprising said first means, associated with each of said holders and cooperating with said stop means; and wherein respective ones of said linkages and holders are located opposite said stop.

16. The tool of claim 15, wherein said centrifugal means are two arms, one for each holder.

17. The tool of claim 13, wherein the centrifugal force urges said first and second elements downwardly in a direction substantially parallel to said axis, for the machining of faces.

18. The tool of claim 17, including a flange adjustably movable on said tang; a skirt rigid with said tang and depending therefrom, for pivotally mounting said centrifugal means; said linkages cooperating with said tang to individually support holders to permit said movement thereof; and wherein said first means are associated with each of said holders and operate in cooperation with said flange.

19. The tool of claim 18, wherein said centrifugal means are two levers.

20. The tool of claim 1, wherein said two stages of grinding are the rough and final stages, respectively.

References Cited

UNITED STATES PATENTS

| | | | |
|---|---|---|---|
| 2,065,221 | 12/1936 | Hellyar | 51—332 XR |
| 2,229,314 | 1/1941 | Solbrig | 51—332 |
| 2,611,222 | 9/1952 | Johnson | 51—332 |

LESTER M. SWINGLE, *Primary Examiner.*